(12) United States Patent
Bleshoy

(10) Patent No.: US 7,896,281 B2
(45) Date of Patent: Mar. 1, 2011

(54) ANIMAL LEASH ASSEMBLY WITH LEASH THAT CAN BE MECHANICALLY WOUND UP AND UNWOUND

(75) Inventor: Ernst-Peter Bleshoy, Hamburg (DE)

(73) Assignee: Flexi-Bogdahn Technik GmbH & Co. KG, Bargteheide (DE)

( * ) Notice: Subject to any disclaimer, the term of this patent is extended or adjusted under 35 U.S.C. 154(b) by 114 days.

(21) Appl. No.: 11/776,993

(22) Filed: Jul. 12, 2007

(65) Prior Publication Data
US 2008/0011895 A1  Jan. 17, 2008

(30) Foreign Application Priority Data
Jul. 14, 2006  (DE) .................. 20 2006 010 918 U

(51) Int. Cl.
*B65H 75/30* (2006.01)
(52) U.S. Cl. .................. 242/384.7; 242/385.4; 119/796
(58) Field of Classification Search ............. 242/381.6, 242/384.7, 385.4, 385, 382, 381, 371, 370, 242/396, 396.1, 396.2, 396.4; 119/794, 796, 119/797, 798; 74/412, 413
See application file for complete search history.

(56) References Cited

U.S. PATENT DOCUMENTS

| | | | |
|---|---|---|---|
| 2,314,504 A | 3/1943 | Lifchultz | |
| 2,919,676 A * | 1/1960 | Schneider | .................. 119/796 |
| 3,099,250 A | 7/1963 | Soles, Jr. | |
| 3,693,596 A * | 9/1972 | Croce et al. | .................. 119/796 |
| 3,782,215 A * | 1/1974 | Moody | ........................ 74/410 |
| 3,853,283 A * | 12/1974 | Croce et al. | ............... 242/381.6 |
| D235,026 S | 4/1975 | Bogdahn | |
| 3,880,379 A * | 4/1975 | Booth | .................. 200/61.58 B |
| 3,937,418 A | 2/1976 | Critelli | |
| 4,328,766 A | 5/1982 | Deibert | |
| 4,501,230 A | 2/1985 | Talo | |
| 4,562,792 A | 1/1986 | Pak et al. | |
| 5,257,754 A * | 11/1993 | Hishon | .................... 242/382.2 |
| 5,377,626 A | 1/1995 | Kilsby et al. | |
| 5,401,034 A * | 3/1995 | Mallinger | .................... 473/576 |
| 5,483,926 A | 1/1996 | Bogdahn | |
| 5,595,143 A | 1/1997 | Alberti | |
| D392,429 S | 3/1998 | Plewa et al. | |
| 5,890,456 A | 4/1999 | Tancrede | |
| 6,148,773 A | 11/2000 | Bogdahn | |
| D439,302 S | 3/2001 | Plewa | |
| D448,892 S | 10/2001 | Hans | |
| 6,526,918 B1 * | 3/2003 | Arnold | ........................ 119/796 |
| 6,904,872 B2 * | 6/2005 | Muller | ........................ 119/796 |
| D519,246 S | 4/2006 | Plewa | |
| 7,040,257 B2 * | 5/2006 | Waxman et al. | ............. 119/796 |
| 7,168,393 B2 | 1/2007 | Bogdahn et al. | |
| 2007/0131177 A1 * | 6/2007 | Perkitny | ..................... 119/796 |
| 2008/0271683 A1 * | 11/2008 | Mitchell | ..................... 119/796 |

* cited by examiner

*Primary Examiner*—Michael R Mansen
*Assistant Examiner*—Juan J Campos
(74) *Attorney, Agent, or Firm*—Howson & Howson LLP

(57) ABSTRACT

A leash assembly for an animal leash that can be wound up and unwound is provided. The leash assembly features a housing (11) and a roll (12) that is rotatably supported in the housing, and the leash (13) can be unwound from this roll against the force of a spring and wound up on the roll with the aid of this spring force. The roll cooperates with a gear mechanism that drives a plate cam. The plate cam releases a pawl that can be engaged with the roll and stops the rotation of the roll in the unwinding direction once a predetermined length of the leash is unwound.

19 Claims, 3 Drawing Sheets

ANIMAL LEASH ASSEMBLY WITH LEASH THAT CAN BE MECHANICALLY WOUND UP AND UNWOUND

BACKGROUND OF THE INVENTION

The invention pertains to an animal leash assembly for a leash that can be wound up and unwound, wherein the leash assembly features a housing and a roll that is rotatably supported in the housing, and wherein the leash can be unwound from this roll against the force of a spring and wound up on said roll with the aid of this spring force. The invention specifically pertains to a retractable dog leash, and although the following description primarily refers to a leash assembly for dogs, the invention is not limited to this particular application.

A dog leash of this type is known, for example, from EP 0 941 657 B1. The housing of this leash accommodates the leash and the roll and features a handle for carrying the leash assembly. A braking device is provided in order to stop the leash at the desired length. The braking device is also provided with a locking mechanism for holding the braking device in the stopped state. The desired length of the leash then remains in the extended state.

Such a dog leash enables the dog to move about freely for the most part. The range of motion can be restricted and the dog can be restrained by actuating the braking device. The leash frequently is completely unwound, particularly in open terrain. However, it would be desirable to restrict the range of motion of the dog to a certain maximum length beforehand, for example, when walking the dog in the city or in buildings. In the known dog leash, the person walking the dog must lock the leash at the desired length. In this case, the leash sags if the dog does not utilize its full length.

SUMMARY OF THE INVENTION

The invention is based on the problem of realizing a leash assembly of the initially cited type in such a way that the maximum extended length of the leash can be limited. In this case, it should be possible to continue winding up and unwinding the leash until this length is reached.

According to the invention, this problem is solved in that the roll cooperates with a gear mechanism that drives a plate cam, wherein the plate cam releases a pawl that can be engaged with the roll once a predetermined length of the leash is unwound and stops the rotation of the roll in the unwinding direction. Due to this gear mechanism, the leash functions like a shorter leash when the pawl is released. If the pawl is not released and therefore not engaged with the roll, the leash functions like a conventional leash without such a length restriction.

It is advantageous if the pawl is locked by an actuating lever in a position in which the pawl cannot be engaged with the roll. Due to these measures, the user is able to preadjust a certain maximum length of the leash. The entire leash can be unwound from the roll when the user moves the actuating lever into a position in which the pawl is locked. If the actuating lever is moved into a position in which the pawl is released, it engages with the roll once a predetermined length is reached such that only the shorter length of the leash is available.

It is particularly advantageous if the pawl can only be engaged with the roll in the unwinding direction. This provides the advantage that the maximum length of the leash can be adjusted at any time, even when the leash is extended to its maximum length. If the leash is wound up during its intended use until the predetermined shorter length is reached, the pawl engages with the roll when the leash is unwound again such that the maximum length of the leash is restricted. The entire operation of the leash is simplified in this fashion.

Relatively high forces act upon the pawl when the adjusted length is reached, particularly when the leash is used on larger or spirited dogs. The invention therefore proposes that the pawl is held on the housing in a pivoted fashion and supported on the housing against the rotational movement of the roll when it engages with the roll. This makes it possible to reliably introduce the tensile force acting upon the roll into the housing. The gear mechanism itself need not transmit any forces, so that its dimensions need not be adapted to the force to be transmitted.

The pawl essentially may cooperate with the gear mechanism in any suitable fashion. For example, the pawl is connected to a release lever that cooperates with the plate cam. This makes it possible to simplify the construction. The gear mechanism moves the release lever into a position in which the pawl can be engaged with the roll. The gear mechanism need only move the release lever in this case.

It would also be possible for the release lever to hold the pawl in a position in which it is disengaged from the roll against the force of a spring. As soon as the release lever is released by the plate cam, the spring causes the pawl to engage with the roll. A reliable function of the leash assembly is achieved in this fashion.

The gear mechanism is preferably realized in the form of a gearwheel mechanism with the desired transmission ratio. The invention proposes that the gear mechanism comprise a pinion arranged on the axle of the roll and at least one intermediate gearwheel that meshes with the pinion and drives the plate cam. The plate cam is advantageously realized in the form of an internally geared gearwheel that is positioned concentric to the axle of the roll and meshes with at least one intermediate gearwheel. This design makes it possible to realize the gear mechanism in a space-saving fashion. It is also possible, in particular, to realize the desired transmission ratio. For example, the plate cam may rotate much slower than the roll if the pinion, the intermediate gearwheel and the internally geared gearwheel are provided with a corresponding number of teeth, and the pawl is released only once during the entire unwinding movement of the roll. This provides the advantage that only a single reduced length can be adjusted. Operating errors are therefore reliably prevented.

Such leash assemblies are subjected to harsh operating conditions. The invention therefore proposes that the gear mechanism be encapsulated within the housing. Dirt or abraded particles cannot be admitted into the gear mechanism and impair its operation in this case.

The plate cam may also cooperate with the pawl or the release lever in any suitable fashion. According to the invention, it is proposed that the plate cam feature a control cam or a control depression that cooperates with the release lever on the circumferential surface facing away from the rotational axis. In light of the fact that the plate cam also turns significantly slower than the roll, such a control cam or such a control depression suffices for realizing a single release of the pawl after a predetermined number of revolutions of the roll. The pawl can engage with the roll as soon as the release lever cooperates with the control cam or the control depression.

It is advantageous that the roll features lateral flanges, between which the leash runs, and that at least one flange features at least one locking projection or locking depression, into which the pawl engages in the released position. In this case, the roll can be stopped in the unwinding direction when the release lever moves into the region of the control cam or the control depression of the plate cam and the pawl is situated in the region of the locking projection or the locking depression of the roll. If the pawl is not released, the release lever moves over the control depression or the control cam without affecting the pawl. The leash can be unwound to its maximum length in this case.

However, if the pawl is released, the release lever cooperates with the control cam or the control depression such that the pawl is engaged with the locking projection or the locking depression of the roll, for example, under the influence of a spring force. This causes the roll to stop in the unwinding direction.

Since the pawl only causes the roll to stop in the unwinding direction thereof, the leash can be wound up regardless of the release of the pawl. It is therefore always ensured that the leash can be wound up. The leash assembly may feature conventional braking means that serve for stopping the winding movement of the leash and make it possible to lock the leash at any desired length.

BRIEF DESCRIPTION OF THE DRAWINGS

The invention is described in greater detail below with reference to the schematic drawings. In these drawings.

DETAILED DESCRIPTION OF THE INVENTION

Figure 1:
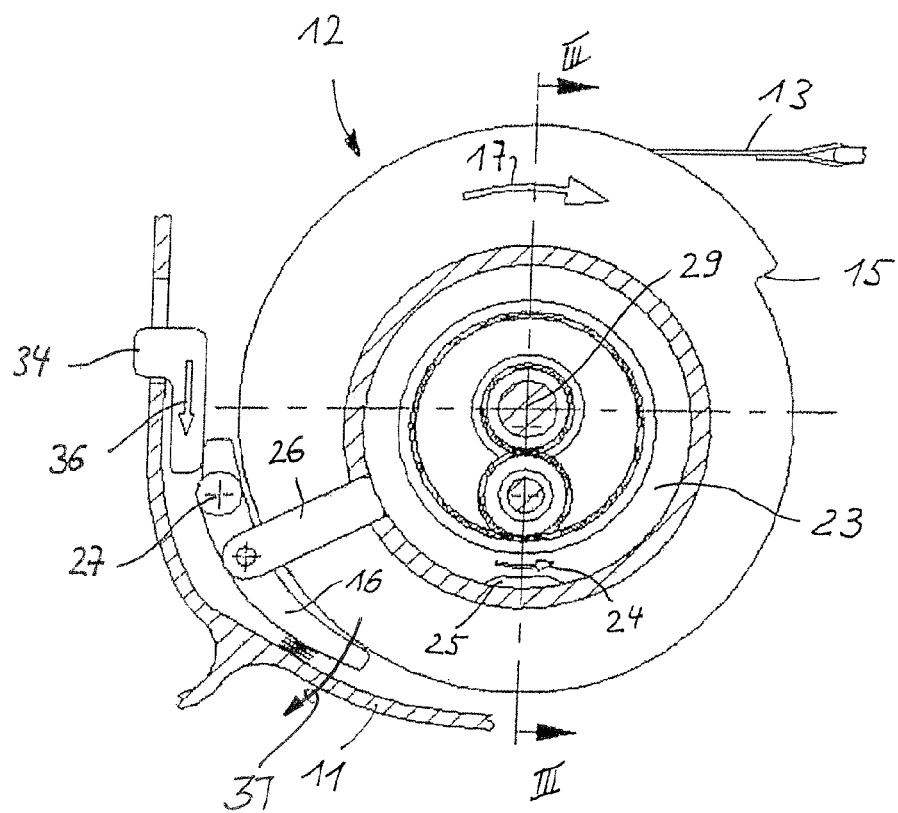
FIG. 1 shows a leash assembly according to the invention with the pawl in the locked state.

The leash assembly illustrated in the drawings features a housing 11, in which a roll 12 is rotatably supported. A leash 13 arranged on the roll 12 can be unwound from the roll against the force of a coil spring, not shown, and wound up on said roll with the aid of this spring force.

The roll 12 features a lateral flange 14 that defines a free space together with an opposite flange that is not illustrated in the figure, wherein the leash 13 is laterally guided on the roll within this free space. The flange 14 is provided with a locking projection 15 that cooperates with a pawl 16. The pawl 16 serves for stopping the unwinding movement in the direction of the arrow 17 so as to limit the length of the unwound leash.

The pawl 16 is engaged with the locking projection 15 by means of a gear mechanism 18, described below. The gear mechanism 18 is arranged between the flange 14 and the wall 19 of the housing 11 of the leash assembly. It comprises an intermediate gearwheel 20 that is rotatably supported on the housing by means of a stub shaft and meshes with a pinion 21 arranged on the rotational axis 29 of the roll 12. The intermediate gearwheel 20 is engaged with the internal gearing 22 of the plate cam 23 that consequently turns opposite to the rotating direction of the roll, namely in the direction of the arrow 24 in FIG. 1. The transmission ratio is specifically realized such that the plate cam 23 rotates slower than the roll 12 and opposite to the rotating direction thereof. For example, the roll 12 carries out six to ten revolutions during one revolution of the plate cam 23.

The plate cam 23 features a depression 25, into which a control lever 26 can engage. This arrangement is realized such that the control lever 26 is connected in an articulated fashion to the pawl 16 which, in turn, is supported in an articulated fashion on a pivot pin 27 in the housing. A compression spring 28 presses the pawl in the direction of the rotational axis 29 of the roll 12. Due to this arrangement, the pawl 16 constantly tends to move in the direction of the rotational axis 29. This movement is prevented by the control lever 26, which is supported in a radial opening 30 of a bearing shell 31 that concentrically surrounds the plate cam 23 such that it can be moved back and forward.

The control lever 26 consequently holds the pawl 16 in a position in which it cannot be engaged with the locking projection 15 of the roll 12. The plate cam 23 prevents the control lever 26 from penetrating into the bearing shell in the direction of the rotational axis 29 as long as the face of the control lever 26 lying on the circumferential surface of the plate cam 23 is not situated in the region of the depression 25.

Once the depression 25 of the plate cam 23 moves into the region of the opening 30, the control lever 26 is able to move in the direction of the rotational axis 29 and the pawl 16 also pivots in the direction of the rotational axis 29 due to the force of the spring 28. If the front edge 32 of the pawl 16 is situated in the region of the locking projection 15 in this rotational position of the plate cam 23, the pawl can engage with the roll such that the rotational movement of the roll in the direction of the arrow 17 is stopped. This position of the pawl 16 is illustrated in FIG. 2.

Figure 2:
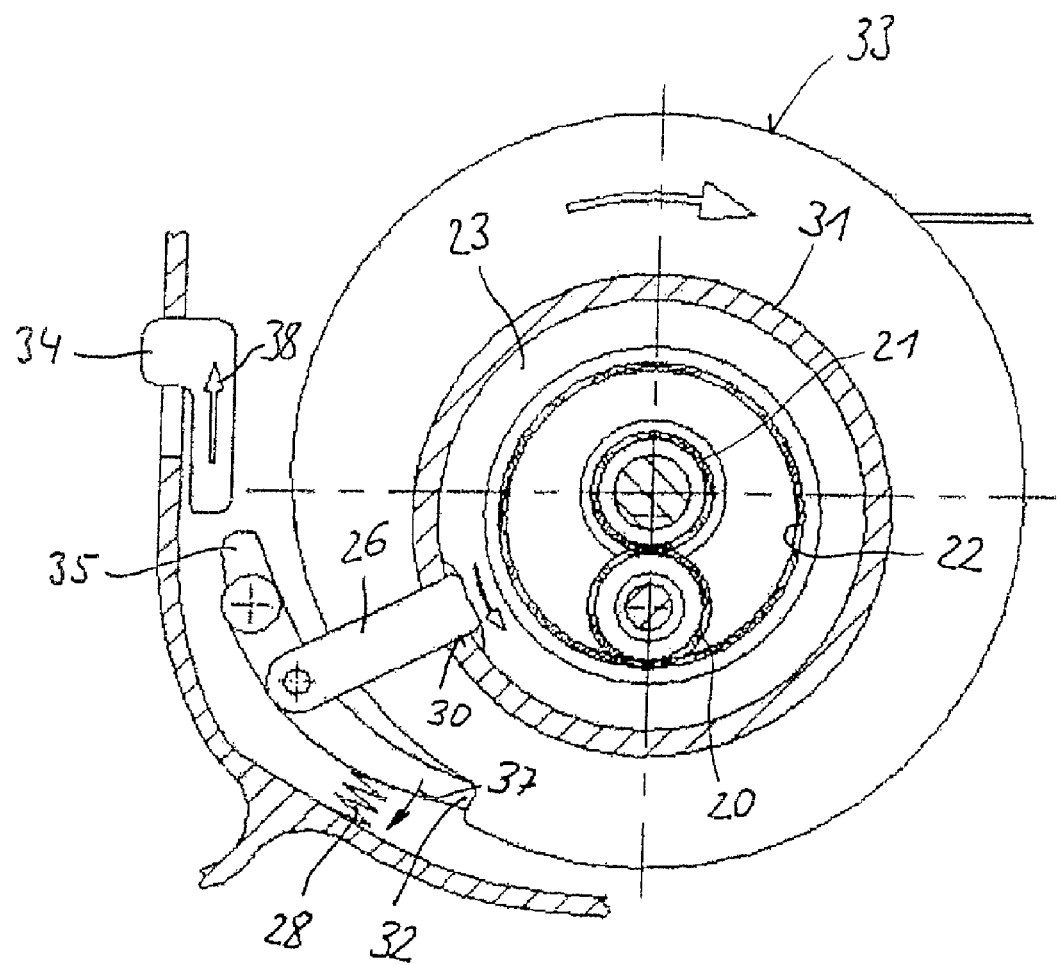
FIG. 2 shows the leash arrangement according to FIG. 1, however, with the pawl in the released state.
Figure 3:
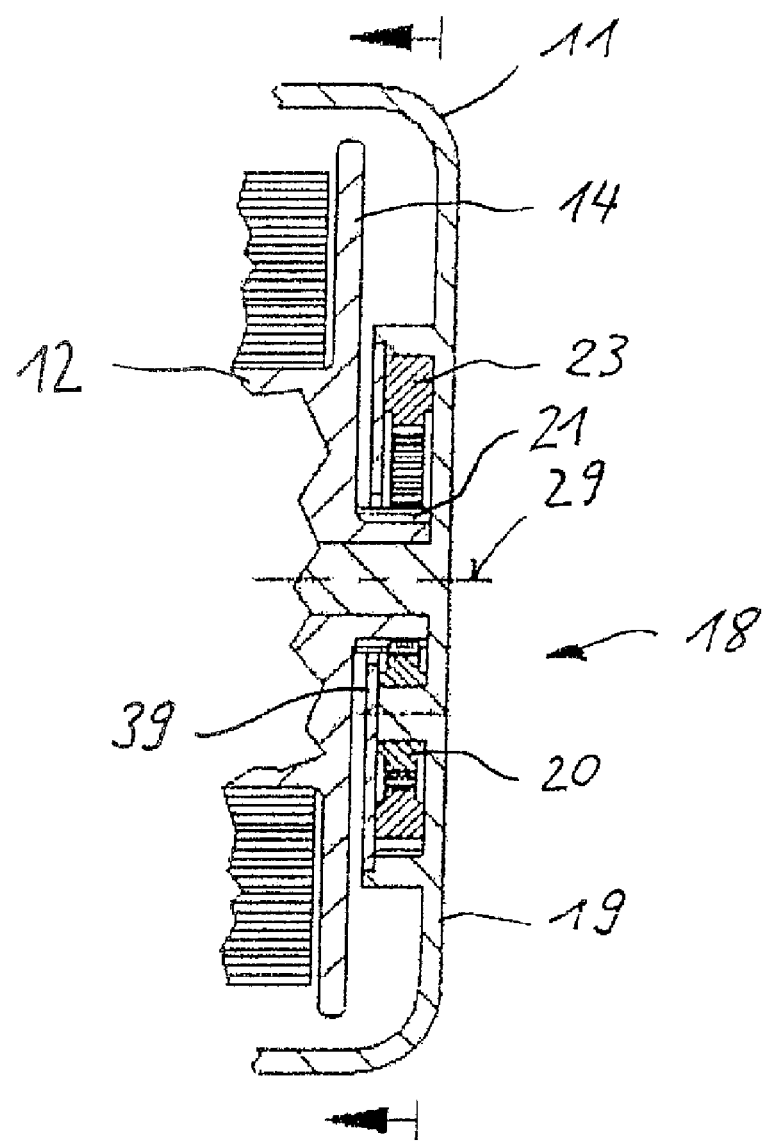
FIG. 3 shows a section along the line III-III in FIG. 1.

In the position of the plate cam 23 relative to the roll 12 that is illustrated in FIG. 2, the pawl can engage with the locking projection 15 such that the leash is stopped at a predetermined shorter length. In this case, the leash cannot be additionally unwound. However, it is still possible to wind up the leash opposite to the rotating direction indicated by the arrow 17 under the influence of the spring force because the pawl 16 does not prevent a rotational movement in this direction.

The arrangement is realized, in particular, such that the circumferential surface 33 of the flange 14 has a widening radius in order to enable the pawl 16 to slide on the circumference in the wind-up direction of the roll 12. The pawl 16 therefore is once again moved away from the rotational axis 29 by the circumferential surface 33 of the flange 14, namely into a position that corresponds to the position according to FIG. 1. The plate cam 23 is simultaneously turned such that the control lever 26 is moved out of the depression 25. In this case, the pawl 16 is supported on the circumferential surface of the plate cam 23 by means of the control lever 26 and can no longer engage with the locking projection 15 of the roll 12. This means that the leash 13 is wound up and unwound analogous to an arrangement without a pawl, even if the pawl is released. This does not cause an altered operation. The pawl merely limits the maximum unwinding length.

It is evident in the drawings that the roll 12 is locked only in the unwinding direction 17 if the control lever 26 penetrates into the depression 25 of the plate cam 23 and the front edge 32 of the pawl 16 is situated in the region of the locking projection 15. These positions of the cooperating components are only reached once during the course of the unwinding process, so that this measure makes it possible to lock the leash 13 at only one predetermined length.

Without further measures, the pawl would always engage when the reduced length is reached and therefore prevent the leash 13 from being additionally unwound. In order to unwind the entire leash 13, an actuating lever 34 is provided and arranged on the housing 11 such that it can be actuated externally. The actuating lever is able to block the pawl 16 in a position in which it cannot engage with the roll 12.

This is achieved, in particular, in that the pawl features a lever extension 35 that lies opposite of the front edge 32 and cooperates with the actuating lever 34 in such a way that a displacement of the actuating lever 34 in the direction of the arrow 36 causes the pawl 16 to be pivoted in the direction of the arrow 37 and held in the extended position by the actuating lever 34. In this position, the pawl 16 is unable to pivot in the direction of the rotational axis 29, even if it is released from the control lever 26, so that the pawl always remains disengaged from the roll even if the depression 25 is situated in the region of the opening 30 and the front edge 32 could cooperate with the locking projection 15. In this position of the actuating lever 34 that is illustrated in FIG. 1, the leash therefore can be completely unwound. Only the displacement of the actuating lever in the direction of the arrow 38 in FIG. 2 makes it possible to release the pawl such that it can stop the rotational movements of the roll in the unwinding direction 17 once the predetermined reduced length of the leash 13 is reached.

The tensile force of the leash is transmitted to the housing 11 by the pawl 16 and the pin 27. The gear mechanism 18 merely serves for releasing the pawl 16 by means of the control lever 26. Since no significant forces need to be transmitted, the gear mechanism may be realized with correspondingly small dimensions. Consequently, it can be accommodated between the flange 14 and the wall 19 of the housing, and the gearwheels may be realized correspondingly thin. It is therefore proposed that the bearing shell 31 accommodating the plate cam also forms the outer wall of the gear mechanism 18. In this case, the gear mechanism 18 may be closed by means of a cover plate 39 from the side facing the flange 14. This means that dirt and the like can no longer be admitted into the gear mechanism such that a flawless operation is ensured.

The operation of the leash assembly is not complicated by this additional function of restricting the leash length. The unwinding length can be selected in any state of the leash. For example, if the leash is completely unwound, the actuating lever 34 can be moved into the position shown in FIG. 2. The leash can be wound up despite the released pawl, namely because the pawl 16 cannot engage with the locking projection 15. The pawl would be raised by the widening circumferential surface of the flange 14 and drop in the region of the locking projection without any effect if it were not held in the disengaged position according to FIG. 1 by the control lever 26 anyway.

If the leash is not fully extended to the pre-adjusted reduced length, the pawl 16 prevents the leash from being unwound beyond this length because the plate cam and the locking projection 15 respectively assume a position in which the pawl is able to pivot into the locking projection 15. The leash can no longer be additionally unwound beyond the pre-adjusted reduced length in this case. However, the leash also functions like a conventional automatically retractable leash if the maximum unwinding length of the leash is reduced.

The roll can be released in order to completely unwind the leash 13 at any time by displacing the actuating lever 34 in the direction of the arrow 36 such that the pawl is pivoted into the disengaged position according to FIG. 1.

The gear mechanism can be realized very thin, so that the overall weight of the leash assembly is not increased. The housing can be realized in a manageable and visually appealing fashion despite the additional function.

The invention claimed is:

1. A leash assembly for an animal leash that can be wound up and unwound, comprising:
    a housing (11) and a roll (12) that is rotatably supported in said housing;
    a leash (13) being unwound from said roll to a fully unwound maximum extended length against the force of a spring and wound up on said roll with the aid of a force of the spring;
    a gear mechanism (18) that cooperates with said roll to drive a rotatable plate cam (23);
    a pawl (16) releasable by said plate cam for engaging said roll and preventing rotation of said roll in an unwinding direction (17) after a predetermined restricted maximum length of the leash is unwound, said predetermined restricted maximum length being less than said fully unwound maximum extended length; and
    an actuating lever (34) movable to a first position in which said pawl (16) is locked and cannot engage said roll (12) such that said leash is able to be unwound from said roll to said fully unwound maximum extended length and moveable to a second position in which said pawl (16) is released and automatically engageable with said roll (12) when permitted by said gear mechanism and plate cam and when said leash is unwound to said predetermined restricted maximum length such that said leash can only be unwound to said predetermined restricted maximum length;
    whereby the leash assembly permits said leash to be unwound to said fully unwound maximum extended length when said actuating lever (34) is moved to said first position by a user of said leash assembly and permits said leash to be unwound only to said predetermined restricted maximum length when said actuating lever (34) is moved to said second position by the user of said leash assembly.

2. A leash assembly according to claim 1, wherein said pawl (16) is engagable with said roll (12) only in the unwinding direction (17).

3. A leash assembly according to claim 2, wherein said pawl (16) is arranged in a pivoted fashion on the housing (11) and supported on the housing opposite to rotational movement of said roll (12) when said roll engages therewith.

4. A leash assembly according to claim 3, wherein said pawl is connected to a control lever (26) that cooperates with the plate cam (23).

5. A leash assembly according to claim 4, wherein said control lever (26) holds the pawl (16) in a position in which said pawl is disengaged from the roll (12) against the force of a spring (28).

6. A leash assembly according to claim 5, wherein said gear mechanism (18) includes a pinion (21) arranged on a shaft (29) of said roll (12) and at least one intermediate gearwheel (20) that meshes with said pinion and drives said plate cam (23).

7. A leash assembly according to claim 6, wherein said plate cam (23) is an internally geared gearwheel that extends concentric to said shaft (29) of said roll and meshes with said at least one intermediate gearwheel (20).

8. A leash assembly according to claim 7, wherein said gear mechanism (18) is encapsulated within said housing (11).

9. A leash assembly according to claim 8, wherein said plate cam (23) includes a control cam or control depression (25) that cooperates with said control lever (26) on a circumferential surface that faces away from the rotational axis (29).

10. A leash assembly according to claim 9, wherein control lever (26) engages with said control cam or control depression (25) in only one rotational position of the plate cam (23), and when said control lever (26) engages with said control cam or control depression (25), said pawl (16) engages said roll (12).

11. A leash assembly according to claim 9, wherein said roll includes lateral flanges (14), between which the leash runs, and wherein at least one locking projection (15) or locking depression for engaging said pawl (16) in a released state thereof is provided on at least one of said flanges.

12. A leash assembly according to claim 1, wherein said pawl (16) is arranged in a pivoted fashion on the housing (11)

and supported on the housing opposite to rotational movement of said roll (12) when said roll engages therewith.

13. A leash assembly according to claim 12, wherein said pawl is connected to a control lever (26) that cooperates with the plate cam (23).

14. A leash assembly according to claim 13, wherein said control lever (26) holds the pawl (16) in a position in which said pawl is disengaged from the roll (12) against the force of a spring (28).

15. A leash assembly according to claim 13, wherein said plate cam (23) includes a control cam or control depression (25) that cooperates with said control lever (26) on a circumferential surface of said plate cam that faces away from a rotational axis (29) of said roll.

16. A leash assembly according to claim 1, wherein said gear mechanism (18) is encapsulated within said housing (11).

17. A leash assembly according to claim 1, wherein said roll includes lateral flanges (14), between which the leash runs, and wherein at least one locking projection (15) or locking depression for engaging said pawl (16) in a released state thereof is provided on at least one of said flanges.

18. A leash assembly, comprising:
- a housing (11) and a roll (12) that is rotatably supported in said housing;
- a leash (13) being unwound from said roll to a fully unwound maximum extended length against the force of a spring and wound up on said roll with the aid of a force of the spring;
- a gear mechanism (18) that cooperates with said roll to drive a plate cam (23);
- a pawl (16) releasable by said plate cam for engaging said roll and preventing rotation of said roll in an unwinding direction (17) after a predetermined restricted maximum length of the leash is unwound, said predetermined restricted maximum length being less than said fully unwound maximum extended length; and
- an actuating lever (34) moveable to a first position such that said pawl (16) cannot engage said roll (12) thereby permitting said leash to be unwound from said roll to said fully unwound maximum extended length and moveable to a second position such that said pawl (16) is engageable with said roll (12) when permitted by said gear mechanism and plate cam and when said leash is unwound to said predetermined restricted maximum length thereby limiting said leash to be only unwound from said roll (12) to said predetermined restricted maximum length;
- said gear mechanism (18) including a pinion (21) arranged on a shaft (29) of said roll (12) and at least one intermediate gearwheel (20) that meshes with said pinion and drives said plate cam (23); and
- said plate cam (23) including a control cam or control depression (25) on a circumferential surface, said pawl (16) being connected to a control lever (26) that cooperates with the plate cam (23) to hold said pawl (16) in a position in which said pawl (16) is disengaged from said roll (12) until said control lever (26) engages said control cam or control depression (25) of said plate cam (23).

19. A leash assembly according to claim 18, wherein said plate cam (23) is an internally geared gearwheel that extends concentric to said shaft (29) of said roll and meshes with said at least one intermediate gearwheel (20).

* * * * *